(12) United States Patent
Wende

(10) Patent No.: US 9,169,688 B2
(45) Date of Patent: Oct. 27, 2015

(54) SEALING STRIP FOR A MOTOR VEHICLE, IN PARTICULAR WINDOW SHAFT SEAL STRIP

(71) Applicant: GM GLOBAL TECHNOLOGY OPERATIONS LLC, Detroit, MI (US)

(72) Inventor: Sebastian Wende, Harxheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/888,695

(22) Filed: May 7, 2013

(65) Prior Publication Data

US 2013/0305611 A1 Nov. 21, 2013

(30) Foreign Application Priority Data

May 10, 2012 (DE) .......................... 10 2012 009 354
Nov. 26, 2012 (DE) .......................... 10 2012 023 043

(51) Int. Cl.
*E06B 7/22* (2006.01)
*B60J 10/04* (2006.01)
*B60J 10/00* (2006.01)

(52) U.S. Cl.
CPC ............... *E06B 7/22* (2013.01); *B60J 10/0051* (2013.01); *B60J 10/0068* (2013.01); *B60J 10/041* (2013.01)

(58) Field of Classification Search
CPC .. B60J 10/041; B60J 10/0062; B60J 10/0065; B60J 10/0011; B60J 10/0005; B60J 10/0022; B60J 10/0068; B60R 13/06
USPC ........ 49/377, 374, 475.1, 490.1, 492.1, 493.1
See application file for complete search history.

(56) References Cited

U.S. PATENT DOCUMENTS

| 2,664,602 | A | * | 1/1954 | Bright ........................ 49/490.1 |
| 2,686,691 | A | * | 8/1954 | Burrell ........................ 296/135 |
| 2,968,072 | A | * | 1/1961 | Bright ........................ 49/490.1 |
| 3,545,157 | A | * | 12/1970 | Treber et al. ............... 52/718.01 |
| 4,147,006 | A | * | 4/1979 | Kruschwitz ............... 52/204.599 |
| 4,179,859 | A | * | 12/1979 | Fricko et al. ............. 52/204.591 |
| 4,218,088 | A | * | 8/1980 | Swindlehurst et al. ....... 296/210 |
| 4,249,356 | A | * | 2/1981 | Noso ............................. 52/716.5 |

(Continued)

FOREIGN PATENT DOCUMENTS

| DE | 4242624 A1 | 8/1994 |
| DE | 102005043950 B4 | 11/2007 |

(Continued)

OTHER PUBLICATIONS

German Patent Office, German Application No. 102012023043.5, dated Sep. 18, 2013.

*Primary Examiner* — Katherine Mitchell
*Assistant Examiner* — Justin Rephann
(74) *Attorney, Agent, or Firm* — Ingrassia Fisher & Lorenz PC

(57) ABSTRACT

A sealing strip for a motor vehicle is provided. The sealing strip includes a sealing structure able to be brought into operative position against a window pane of the motor vehicle and a fastening structure for fastening the sealing strip on a body part of the motor vehicle. The fastening structure has a mount able to be fitted onto an end of the body part and has at least one connecting section. The connecting section is able to be brought into operative position against an abutment of the body part to form, with the sealing strip fitted on, a form-fitting locking of the sealing strip and the body part against one another.

13 Claims, 3 Drawing Sheets

(56) References Cited

U.S. PATENT DOCUMENTS

| | | | | |
|---|---|---|---|---|
| 4,263,750 A | * | 4/1981 | Hein | 49/490.1 |
| 4,442,634 A | * | 4/1984 | Kimura | 49/493.1 |
| 4,614,061 A | * | 9/1986 | Brocke | 49/440 |
| 4,696,128 A | * | 9/1987 | Fukuhara | 49/492.1 |
| 4,809,463 A | * | 3/1989 | Schroder et al. | 49/377 |
| 5,018,308 A | * | 5/1991 | Vaughan | 49/490.1 |
| 5,171,051 A | * | 12/1992 | Yada | 296/93 |
| 5,255,472 A | * | 10/1993 | Larsen et al. | 49/490.1 |
| 5,261,206 A | * | 11/1993 | Mesnel et al. | 52/716.1 |
| 5,538,317 A | * | 7/1996 | Brocke et al. | 296/216.09 |
| 5,799,442 A | * | 9/1998 | Takahashi et al. | 49/377 |
| 5,913,762 A | * | 6/1999 | Matsumoto | 49/377 |
| 5,970,659 A | * | 10/1999 | Oord | 49/377 |
| 6,082,048 A | | 7/2000 | Backes et al. | 49/377 |
| 6,205,723 B1 | * | 3/2001 | Farrar et al. | 52/202 |
| 6,345,480 B1 | | 2/2002 | Kemper et al. | 52/395 |
| 6,435,597 B1 | * | 8/2002 | Anders et al. | 296/107.07 |
| 6,681,526 B2 | * | 1/2004 | Mueller et al. | 49/440 |
| 6,742,304 B1 | | 6/2004 | Mueller et al. | 49/377 |
| 6,837,005 B2 | * | 1/2005 | Arata et al. | 49/440 |
| 6,966,601 B2 | * | 11/2005 | Matsumoto et al. | 296/146.2 |
| 7,363,749 B2 | * | 4/2008 | Sultan et al. | 49/490.1 |
| 7,565,771 B2 | * | 7/2009 | Brocke | 49/377 |
| 7,841,636 B2 | * | 11/2010 | Huth et al. | 296/1.08 |
| 7,934,341 B2 | * | 5/2011 | Knight et al. | 49/377 |
| 8,104,227 B2 | * | 1/2012 | Tamura | 49/377 |
| 8,286,389 B2 | * | 10/2012 | Lichtner et al. | 49/490.1 |
| 8,549,790 B2 | * | 10/2013 | Murree et al. | 49/377 |
| 8,714,624 B2 | * | 5/2014 | Fukui | 296/146.1 |
| 2004/0060242 A1 | * | 4/2004 | Coldre et al. | 49/490.1 |
| 2004/0111973 A1 | | 6/2004 | Moisy et al. | |
| 2004/0150171 A1 | * | 8/2004 | Bonds | 277/628 |
| 2004/0200151 A1 | * | 10/2004 | Tognetti et al. | 49/377 |
| 2006/0010779 A1 | * | 1/2006 | Schlachter et al. | 49/477.1 |
| 2006/0254149 A1 | * | 11/2006 | Kanbara et al. | 49/377 |
| 2007/0227073 A1 | * | 10/2007 | Tognetti et al. | 49/377 |
| 2008/0178532 A1 | * | 7/2008 | Leung | 49/490.1 |
| 2008/0246304 A1 | * | 10/2008 | Huttebraucker et al. | 296/146.9 |
| 2009/0113691 A1 | * | 5/2009 | Tamura | 29/469 |
| 2010/0011671 A1 | * | 1/2010 | Gentemann | 49/489.1 |
| 2010/0186301 A1 | * | 7/2010 | Drozd et al. | 49/490.1 |
| 2010/0300002 A1 | * | 12/2010 | Ertl | 49/489.1 |
| 2012/0180398 A1 | * | 7/2012 | Priess et al. | 49/493.1 |
| 2012/0297726 A1 | * | 11/2012 | Ellis et al. | 52/716.7 |
| 2013/0093141 A1 | * | 4/2013 | Guellec | 277/637 |
| 2013/0133267 A1 | * | 5/2013 | Kanazawa | 49/475.1 |
| 2013/0174492 A1 | * | 7/2013 | Laycoe et al. | 49/475.1 |
| 2013/0270855 A1 | * | 10/2013 | Fukui | 296/146.1 |
| 2013/0340348 A1 | * | 12/2013 | Matsuura | 49/442 |

FOREIGN PATENT DOCUMENTS

| DE | 102008026046 A1 | 12/2009 |
| EP | 1679212 A1 | 7/2006 |

* cited by examiner

SEALING STRIP FOR A MOTOR VEHICLE, IN PARTICULAR WINDOW SHAFT SEAL STRIP

CROSS-REFERENCE TO RELATED APPLICATION

This disclosure claims priority to German Patent Application No. 10 2012 009 354.3, filed May 10, 2012 and to German Patent Application No. 10 2012 023 043.5, filed Nov. 26, 2012, which is incorporated herein by reference in its entirety.

TECHNICAL FIELD

The technical field relates to a sealing strip for a motor vehicle with at least one sealing structure able to be brought in operative position against a window pane of a motor vehicle and with a fastening structure for fastening the sealing strip on a body part of the motor vehicle. technical field further relates to such a body part. Furthermore, the technical field relates to a sealing arrangement with a body part and with a sealing strip fastened thereon.

BACKGROUND

Sealing strips of the type mentioned here come into use for example as a window well strip, in order to seal the window well of a motor vehicle with respect to a window pane which is able to be introduced therein and hence to protect the window well from moisture. Sealing strips hitherto have the tendency that they at least partially become detached from the body part over time. For example, in a sealing strip constructed as a window well strip, frequently a raising of the window well strip centrally or on the end side occurs relatively with respect to the outer skin of the vehicle door, on which the window well strip is fastened. The detaching is due substantially to the usually curved or respectively bulging configuration of the vehicle door. The window well strip, which in itself is relatively inherently stable, is therefore to be adapted to the contour of the outer skin on mounting. Owing to the tensions implicit therein, after a certain time a raising of the window well strip occurs in individual length sections. The consequence is an uneven joining pattern forming on the visible side between the window well strip and the door edge of the door panel serving for the fastening of the window well strip. The raising of the window well strip relatively with respect to the door edge is also promoted by manufacturing tolerances of the door panel.

It is therefore desirable to propose a sealing strip that is permanently attached to the body part and therefore the intended joining pattern is permanently retained. In addition, other objects, desirable features and characteristics will become apparent from the subsequent summary and detailed description, and the appended claims, taken in conjunction with the accompanying drawings and this background.

SUMMARY

According to an exemplary embodiment, a sealing strip for a motor vehicle has at least one sealing structure able to be brought into operative position against a window pane of a motor vehicle, and a fastening structure for fastening the sealing strip to a body part of the motor vehicle. A body part is also to be understood here to mean a body attachment part.

The fastening structure has a mount able to be fitted onto an end of the body part. This mount, able to be fitted or placed onto the end of the body part, can be constructed so as to be substantially U-shaped for example viewed in cross-section of the sealing strip, so that in the mounted state of the sealing strip a section or end of the body part is situated between the legs of the U-shaped mount.

Preferably, the mount extends along the longitudinal extent of the sealing strip. Thereby, a particularly stable and good fixing of the sealing strip to the body part is realized.

According to an embodiment the fastening structure has at least one connecting section which is able to be brought into operative position against an abutment of the body part in order to form a form-fitting locking of the sealing strip and body part against one another when the sealing strip is fitted.

Through this provision, the sealing strip is fixed permanently on the body part when the connecting section is brought into the form-fitting locking position against the abutment. A raising on the end side or centrally of the sealing strip with respect to the body part is effectively prevented. Owing to the form-fitting locking, the connection withstands high withdrawal forces, so that an unintentional detaching of the sealing strip from the body part, for example owing to prevailing tensions in the sealing strip and/or in the body part, is permanently prevented.

Through the connecting section and the form-fitting locking with the body part which is able to be realized thereby, the sealing strip remains permanently in the predetermined position on the body part, so that an uneven joining pattern, changing over time, on the outwardly directed visible side of body part and sealing strip is effectively prevented.

Also, through the connecting section and the form-fitting locking with the body part which is able to be realized thereby, any manufacturing tolerances of the body part and/or of the sealing strip remain without an effect on the quality of the connection, as long as the connecting section can be brought into the form-fitting locking position against the abutment of the body part.

The form-fitting locking of the sealing strip and body part is promoted when the connecting section is movable elastically to a certain extent. Also, any manufacturing tolerances of the body part and/or of the sealing strip can thereby be already compensated, so that despite such manufacturing tolerances the connecting section forms the form-fitting locking with the body part.

In an exemplary embodiment, the connecting section is able to be locked in a form-fitting manner detachably against the abutment. Thereby, for example in the case of damage or in the case of servicing, the sealing strip can be dismantled without difficulty, by the form-fitting locking being neutralized by detaching the connecting section from the abutment.

According to an embodiment, the connecting section stands with its effective surface substantially perpendicularly inwards from the wall or stands inclined inwards in the introduction direction into the mount. Thereby an optimum engaging of the connecting section against the abutment of the body part and hence an effective and secure form-fitting locking of sealing strip and body part is ensured. As used herein, the effective surface is to be understood to mean the surface which comes in contact with the abutment, in order to form the form-fitting locking.

According to a further embodiment, the connecting section is connected with a wall of the mount, is arranged on a wall of the mount and/or is formed on a wall of the mount. Thereby a simple mounting of the sealing strip on the body part is achieved, because in the course of placing the sealing strip onto the end of the body part an engagement of the connecting element against the abutment of the body part occurs, without the fitter having to carry out a further mechanical movement for this.

In so far as the connecting section is movable elastically, it is preferential that the connecting section, on pushing on of the mount onto the end of the vehicle body owing to an active restoring force brings itself automatically into the locking position, so that solely by the movement of placing the sealing strip onto the end of the body part the form-fitting locking of sealing strip and body part is brought about.

The connecting section can be realized on the wall of the mount or connected with the wall of the mount in a technically simple manner when the connecting section is formed on the wall. The connecting section and mount can be produced from one piece, for example can be cast in one piece.

In an exemplary embodiment, the mount or respectively the walls of the mount of the connecting section can consist of different material. The mount can be formed from such a material by which a permanently stable mount is produced for the body part. In addition, the connecting section can be formed from such a material which is particularly suitable for the construction of a form-fitting locking with the body part, wherein for example the material enables at the same time to a certain extent a compensation of manufacturing tolerances on the sealing strip and/or on the body part.

For example, the connecting section can be formed from more elastic material than the mount or respectively its walls. By the material of the connecting section, the compensation of prevailing manufacturing tolerances on the body part and/or on the sealing strip is promoted, so that despite such manufacturing tolerances a permanently stable form-fitting locking of the connecting section against the body part is achieved. At the same time, through the material of the mount or respectively its walls a sufficient component strength is provided, in order to ensure the desired holding function of the mount.

In an exemplary embodiment, the mount or respectively the walls of the mount and the connecting section consist of plastic. In particular, the mount or respectively the walls of the mount can consist of a thermoplastic (abbreviated to: TP), such as for example polypropylene (abbreviated to: PP), and the connecting section can consist of an elastomer, such as for example ethylene propylene diene rubber (abbreviated to: EPDM), or of a thermoplastic elastomer (abbreviated to: TPE). A connecting section which is realized in such a way offers the advantage that its elasticity can be set to predetermined values, according to the selection of the corresponding elastomer or thermoplastic elastomer. Through such a flexibly predeterminable elasticity of the connecting section, according to requirement and according to the order of magnitude of the toleranances to be expected on the body component and/or on the sealing strip, an elasticity can be set by which the connecting section brings about a form-fitting locking with the body part without difficulty, despite the prevailing tolerances. For example, Shore hardnesses of between 60 and 90 can be predetermined or respectively set.

Through the PP or respectively TP, the fastening structure is given a high degree of rigidity and stability. Through the TPE or respectively TPV or respectively SEBS, a high degree of flexibility and elasticity is given to the structures formed therefrom.

In so far as the connecting section is attached to the mount, with different materials of connecting section and mount the attachment can be realized in a technically simple manner, the connecting section is injected on the mount or respectively its wall.

Alternatively, the mount and connecting section can consist of the same material. Also in this embodiment, the connecting section and mount or respectively the walls thereof can consist of plastic. For example, the connecting section and mount or respectively the walls thereof can be formed from TP, such as PP. Thereby, the mount or respectively the walls thereof is given a sufficient component strength, in order to ensure the desired holding function of the mount. Thereby, the connecting section of the same material is given the same component strength.

According to an embodiment, the connecting section is constructed in the manner of a snap element, such as for example a snap hook, which is able to be brought into detent connection against the abutment of the body part. Thereby, the connecting section is able to be realized in a technically simple manner, in particular when the connecting section consists of plastic and for example is formed on the mount or on another component of the sealing strip.

In another embodiment, the snap element is constructed in the manner of knobs or bulges which engage into corresponding depressions or respectively undercuts or cutouts of the body part.

Alternatively, the connecting section can be constructed in the manner of a detent element which is able to be brought into detent connection against the abutment of the body part.

A preferred embodiment is produced when the connecting section is constructed in the manner of a snap element or detent element, in particular in the manner of a hook, and the connecting section is formed or respectively injected on a wall of the mount. The wall of the mount consists of a thermoplastic, such as for example PP, and the connecting section is formed from a thermoplastic elastomer, such as for example TPV or SEBS. Thereby, the mount is constructed so as to have particular component stability, so that the sealing strip can be placed with a secure and stable fit onto the body part. At the same time the connecting section is locked in a form-fitting manner against the abutment of the body part and this locking comes about owing to the material-conditioned elasticity of the connecting section despite existing manufacturing tolerances on the body part and/or on the sealing strip.

Thereby also a dismantling of the sealing strip for example in the case of damage or in the case of servicing is facilitated, because by separate disengaging of the recess the form-fitting locking can be neutralized in a simple manner.

According to a further embodiment, several connecting elements are provided, which are able to be brought into detent connection respectively against the one abutment of the body part. Thereby, the sealing strip offers several engagement possibilities for the abutment of the body part, so that a flexible and individual adaptation to structural conditions of the body part and also of the sealing strip is possible and nevertheless the form-fitting locking can be realized between the sealing strip and the body part.

According to a preferred embodiment, the several connecting sections are constructed respectively or jointly for example in the manner of a detent element and form a tooth profile, so that on mounting of the sealing strip on the body part a ratchet-like engaging on the abutment of the body part takes place. Thereby, tolerances occurring on the body part and/or sealing strip can be effectively compensated, by the form-fitting connection being realized by engaging into the one of the connecting sections or respectively detent sections and the abutment of the body part according to the order of magnitude of the tolerances which are occurring.

By the tooth profile, the connecting sections or respectively detent sections are realized in such an arrangement on the sealing strip that on mounting of the sealing strip onto the body part it can be brought into several positions, in which respectively an engaging of the sealing strip against the body part takes place.

In this respect, the position of the sealing strip on the body part can be adjusted individually as required, with the formation of a detent connection under one of the respective connecting sections or respectively detent sections and the associated abutment of the body part. The ratchet-like engaging on the abutment facilitates here the mounting of the sealing strip on the body part, in order to bring the sealing strip into the desired position, in which at the same time a form-fitting locking is formed between the sealing strip and the body part.

The possibility presents itself that the tooth profile is a sawtooth profile, which is formed by the detent sections or respectively connecting sections. Through the sawtooth profile, the flanks of the teeth pointing in the respectively identical direction are aligned such that on mounting of the sealing strip on the body part a ratchet-like engaging of the abutment of the body part with respect to the tooth profile is promoted.

In an embodiment, the flanks of the sawtooth profile pointing in the opposite direction are aligned such that a detaching of the already engaged abutment on the sawtooth profile is made difficult and for this a relatively high withdrawal force is to be applied, so that a secure connection of the sealing strip on the body part is permanently present in the engaged state. As a whole, through the several detent sections or respectively connecting sections a secure fastening of the sealing strip on the body part is produced.

According to a further embodiment, the fastening structure is formed by a carrier body carrying the sealing structure. Thereby, the sealing strip is constructed so as to be robust and steady in the region of the fastening structure, in order to be able to permanently enter into a stable and secure connection with the body part.

The carrier body can be formed for example by the mount. In an embodiment, the carrier body, in particular the mount, consists of at least one thermoplastic, such as for example PP. Thereby, the fastening structure or respectively the mount has particular component strength and at the same time is unsusceptible to corrosion. Also, a fastening structure constructed in such a way is relatively light in weight.

The sealing structure of the sealing strip preferably consists of an elastomer or a thermoplastic elastomer, such as for example TPV or SEBS. The structure is thereby relatively light in weight. The sealing structure is thereby also given a good sealing structure.

The sealing effect of the sealing structure is promoted when the sealing structure according to an embodiment has at least one sealing lip which is able to be brought into abutment against the window pane.

According to a further embodiment, in relation to the installed state of the sealing strip, at least the outwardly turned region of the sealing strip has a covering structure which surrounds the fastening structure. Thereby, the sealing strip is covered in the region of the visible side which can be seen from the exterior by a covering structure surrounding the fastening structure in a protective manner. The covering structure can, at the same time, be adapted in color visually to the external conditions of the motor vehicle, in order to produce an attractive outer appearance without having to alter the fastening structure for this. The covering structure offers a protection with respect to the fastening structure from external influences, in particular external mechanical influences.

In an exemplary embodiment, the covering structure is formed by a TPE material, in particular TPV material or SEBS material. The covering structure is thereby to be realized in a technically simple manner, because the covering structure is formed from the material of the sealing structure.

Between the covering structure and the fastening structure, an intermediate space can be formed which can be filled by means of a filling material. The filling material is preferably based on a TPE material or a TPV material or a SEBS material.

The possibility presents itself that the covering structure, the sealing structure and the filling structure filling the intermediate space are formed from the same material. Hereby, the covering structure, the sealing structure and the filling structure are to be realized in a technically simple manner.

In another embodiment, at least one, preferably two material sections, arranged on opposite walls of the mount, are directed inwards, which on introduction of the body part into the mount come into abutment against the body part. The material sections are preferably formed from TPE material, in particular from TPV material or SEBS material. Thereby it is ensured that the sealing strip which is placed onto the end of the body part is held in the mount so as to be wobble-free and under pre-stressing.

The material sections are preferably constructed in an inherently stable manner such that on an introduction of the body part into the mount the material sections come into abutment against the body part with the exerting of a holding force and/or in a sealing manner.

The sealing strip enables a permanent and secure attachment to the body part without a premature detachment, for example at the ends or its centre. Also, the sealing strip, through its form-fitting locking against the body part, enables a secure connection with respect to the body part, which can only be detached by a high withdrawal force which is to be applied.

By the sealing strip being able to be fitted onto the body part, a particularly easy mounting is produced for the fitter.

Through the form-fitting locking, the sealing strip is present permanently in the same position with respect to the body part, so that an even joining pattern exists permanently on the visible side which can be seen from the exterior.

The sealing strip is, as a whole, relatively light in weight and can be produced at a favorable cost, in particular when the sealing strip consists of TPE and the fastening structure consists of PP or TP.

In a further embodiment, a sealing strip of the type described above is able to be fastened on a body part.

According to an embodiment, the body part has a material section constructed as an abutment for the at least one connecting section of the sealing strip. The body part can thereby be brought into a form-fitting locking position with the sealing strip, by the connecting section of the sealing strip being brought into operative position against the material section of the body part.

In an embodiment, the material section stands laterally outwards from the body part. Thereby, the material section is realized in a technically simple manner on the body part, in order to form an effective form-fitting locking with the sealing strip or respectively with the connecting section of the sealing strip.

In another embodiment the material section stands laterally outwards in the region of an end of the body part and is inclined away from the end. Hereby, an easy engaging of the outwardly standing material section against the connecting section of the sealing strip is enabled, whereas by the alignment of the material section inclined away from the end a detaching of the connection is made difficult.

According to a further embodiment includes a sealing arrangement with a body part of the type described above and with a sealing strip fastened thereon of the type described above.

The sealing strip can be a window well strip. Accordingly, the body part can be the outer structure of a vehicle door or a reinforcing structure serving as well reinforcement. The body part is preferably constructed as a sheet metal part.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
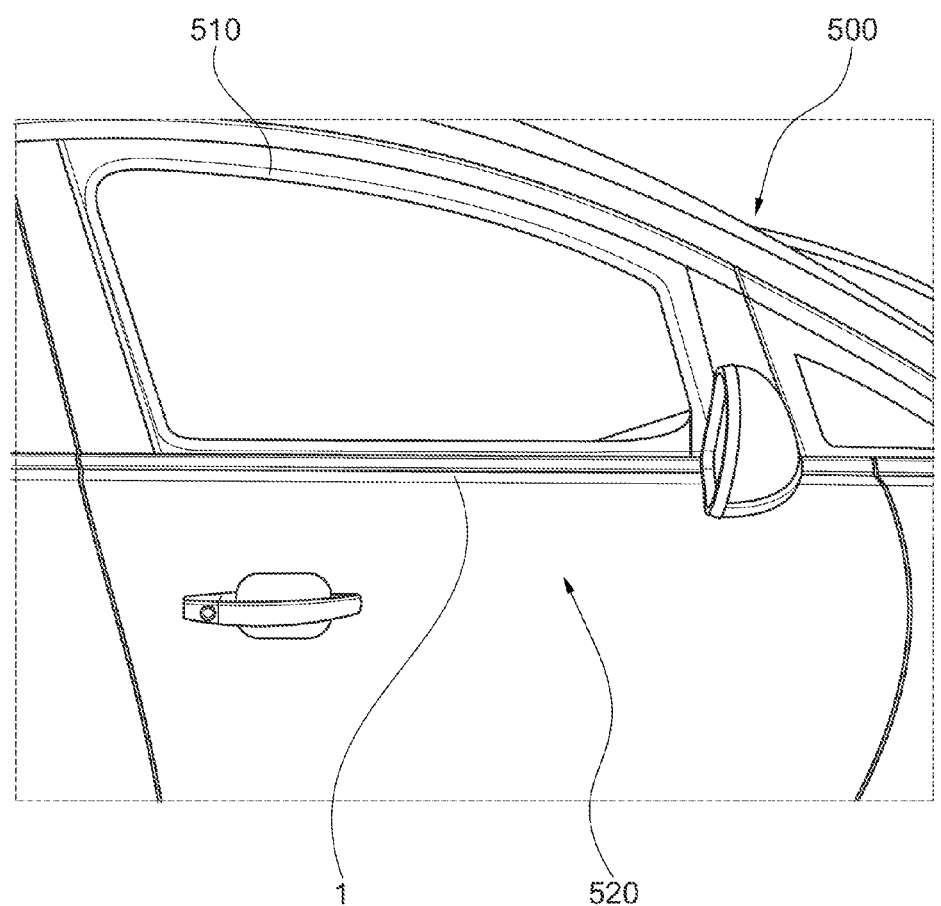
FIG. 1 is by way of example a cutout of a motor vehicle in the region of its vehicle door with a sealing strip, visible from the exterior, for the window well of the vehicle door.

FIG. 1 shows a possible example application for a sealing strip 1 according to an exemplary embodiment. The sealing strip 1 is constructed there as a so-called window well strip on a vehicle door 520 of a motor vehicle 500 and seals the inlet of the introduction well for a movable window pane 510 of the motor vehicle 500 towards the exterior. The sealing strip 1 is brought into abutment in a sealing manner against the window pane 510.

Figure 2:
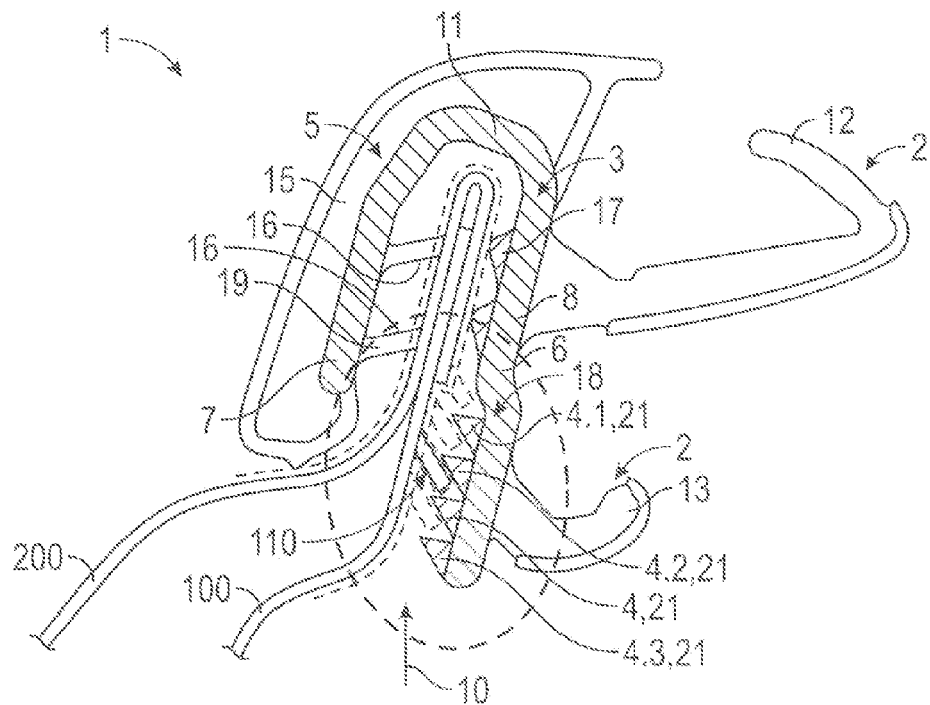
FIG. 2 is an exemplary embodiment of a sealing strip according to FIG. 1 in cross-sectional representation in installed state on the vehicle door.

FIG. 2 shows—in a diagrammatic representation—the sealing strip 1 in a cross-sectional representation. FIG. 2 shows in addition an example for the construction of the vehicle door 520 of FIG. 1 in the attaching region with the sealing strip 1. In the attaching region, two body parts 100 and 200 meet together, wherein the one body part 100 is, for example, a reinforcing structure which serves for reinforcing the vehicle door and/or the well formed by the vehicle door 520 to receive the window pane 510 according to FIG. 1. The body part 200 is formed for example by the outer skin of the vehicle door 520. Preferably, the body parts 100 and 200 are respectively metal parts, in particular sheet metal parts.

As can be seen from FIG. 2, the body part 200 can be shaped in a U-shape in the attaching region for the sealing strip 1, in particular can be bent so that the end region of the body part 100 is situated between the legs of the U-shaped end of the body part 200, and the body parts 100 and 200 form a shared end in the attaching region for the sealing strip 1.

As can also be seen from FIG. 2, the sealing strip 1 according to an embodiment has a fastening structure 3 by which the sealing strip 1 is able to be attached to the shared end of the body parts 100 and 200. For this, the fastening structure 3 has a mount 5 which is able to be placed onto the end of the body parts 100 and 200, so that the body parts 100 and 200 are pushed into the mount 5 in introduction direction 10.

The mount 5 preferably extends along the longitudinal extent of the sealing strip 1, as can be seen in particular from FIG. 1.

In order to prevent the sealing strip 1 from rising for example on the end side or centrally relatively with respect to the body parts 100 and 200, so that therefore the body parts 100 and 200 extend with their shared end region out from the mount 5 of the sealing strip 1 contrary to the introduction direction 10, the sealing strip 1 has a connecting section 4 which is able to be brought into detent connection against an abutment 110 of one of the body parts 100, 200. In the installed state of the sealing strip 1 on the body parts 100 and 200, the connecting section 4 is situated in operative position against the abutment 110 and therefore, with the sealing strip 1 placed on or respectively fitted on, forms a form-fitting locking with at least one of the body parts 100, 200. It is thereby ensured that the flange which is formed by the body parts 100 and 200, in particular the shared end remains permanently fixed in the mount 5 of the sealing strip 1 and thereby a detaching of the flange from the mount 5 is prevented.

In an embodiment, the connecting section 4 is arranged on a wall 6 of the mount 5. For example, the connecting section 4 can be formed as an extension on one of the legs 7 and 8 forming the U-shaped mount 5, for example in connection with the front end of the leg 8 of the mount 5.

As can be seen in particular from FIG. 2, the connecting section 4 can be constructed in the manner of a detent element 21 or detent section.

As can be seen further in particular from FIG. 2, in an embodiment, the sealing strip 1 can have, in addition to the connecting section 4, further connecting sections 4.1, 4.2 and 4.3, which are constructed respectively in the manner of a detent element 21 or detent section and jointly form a tooth profile 18, in particular a sawtooth profile. The connecting sections 4, 4.1, 4.2 and 4.3 are arranged here preferably on one of the legs 7 and 8 of the U-shaped mount 5, wherein the connecting sections 4, 4.1, 4.2, 4.3, viewed in the introduction direction 10, are arranged lying one behind the other, so that on mounting of the sealing strip 1 on the vehicle door 520 a ratchet-like engaging takes place on the one abutment 110 of the body part 100.

Figure 3:
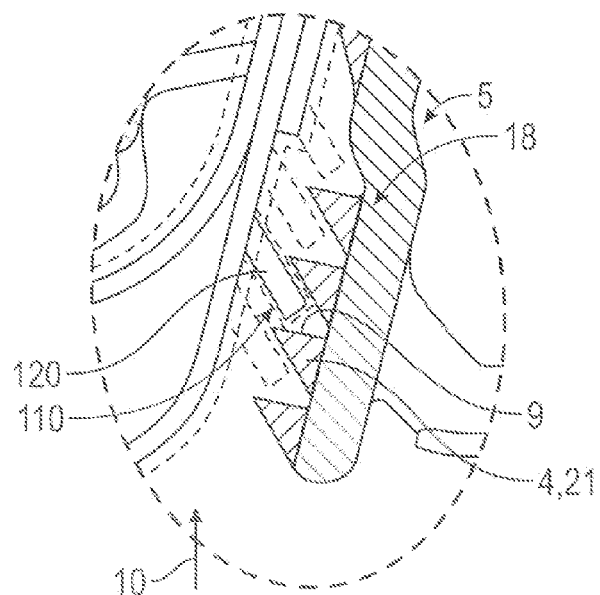
FIG. 3 is a cutout of the sealing strip according to FIG. 2 in the region of a form-fitting connection formed by the sealing strip and the vehicle door.

FIG. 3 shows the region of the tooth profile 18 and of the abutment 110 characterized in FIG. 2 in an enlarged detail representation. The teeth of the tooth profile 18 are constructed uniformly to one another and are explained below with the example of the tooth having the connecting section 4.

In an embodiment, the connecting section 4 is formed by the flank of the tooth which points in the introduction direction 10. The effective surface 9 or respectively detent surface of the connecting section 4 stands substantially perpendicularly inwards into the mount 5. The abutment 110 is formed by a material section 120 of the body part 100, which stands laterally outwards from the body part 100, wherein the material section 120 is aligned with its free end inclined in a direction contrary to the introduction direction 10.

The flanks of the tooth profile 18 pointing contrary to the introduction direction 10 are aligned substantially according to the alignment of the material section 120, whereby the teeth slide along on placing of the mount 5 over the flange of the body parts 100 and 120 and bring about the ratchet-like effect, in an embodiment. By the alignment of the material section 120 on the body part 100, an engagement is produced for the detaching of which a relatively high withdrawal force is necessary.

The fastening structure 3 with the mount 5 and the connecting section 4 or respectively with the tooth profile 18 is preferably formed by a shared base body which serves as carrier body 11 for a sealing structure 2 of the sealing strip 1, as can be seen from FIG. 2. The sealing structure 2 seals against the window pane 510 according to FIG. 1 and can be formed for example by two sealing lips 12 and 13 standing away towards the exterior from the carrier body 11.

As can be further seen from FIG. 2, in an embodiment, in the circumferential region which is visible from the exterior in the installed state, the sealing strip 1 has a covering structure 14 at least partially surrounding and covering the fastening structure 3.

The covering structure 14 surrounds the fastening structure 3 preferably at a predetermined distance, so that between the covering structure 14 and the fastening structure 3 an intermediate space 15 is formed, which can be filled by a filling material.

As can be seen furthermore from FIG. 2, the mount 5 is dimensioned in a predetermined oversize, so that the shared introduction flange of the body parts 100 and 200 is disposed at a distance from the walls 6 and 19 of the mount 5, in particularly is disposed at a slight distance. In order to nevertheless keep the flange of the body parts 100 and 200 free of play in the mount 5, inwardly projecting material sections 16 and 17 are arranged on the side walls 6 and 19 of the mount 5, of which for example the material sections 16 can be constructed as inwardly projecting elastic lips, and the material sections 17 can be configured for example as inherently stable or respectively inherently rigid inwardly directing projections.

The carrier body 11 forming the fastening structure 3 preferably consists of plastic, in particular polypropylene, and the sealing structure 2 and the covering structure 14 and the filling structure for the intermediate space 15 are produced from a thermoplastic elastomer, for example from olefin-based cross-linked thermoplastic elastomers (TPV) or styrene block copolymers.

The body part 100 with the outwardly standing material section 120, which forms the abutment 110 for the sealing strip 1, is in addition preferably a metal part, in particular a sheet metal part.

Figure 4:
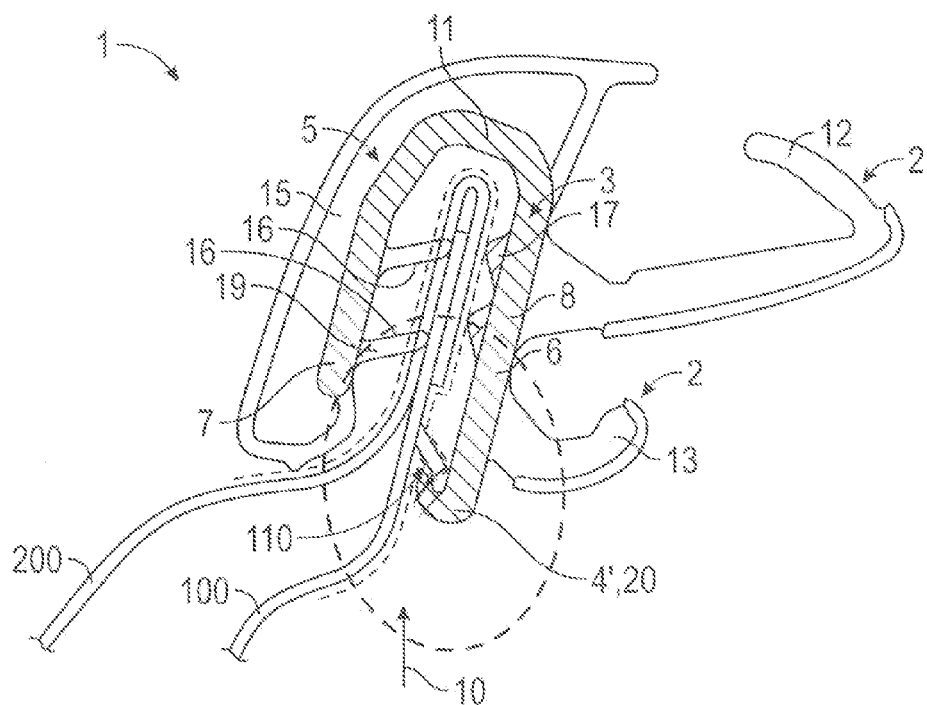
FIG. 4 is a further exemplary embodiment of a sealing strip according to FIG. 1 in cross-sectional representation in installed state on the vehicle door.

FIG. 4 shows—in a diagrammatic representation—a further possible embodiment of a sealing strip 1' in a cross-sectional representation. In FIG. 4 the possible construction of the vehicle door 520 according to FIG. 1 is selected in the same manner in the attaching region with the sealing strip 1'. In this respect, the description with the regard to the construction of the vehicle door 520 according to FIGS. 2 and 3 is to be carried over to FIG. 4.

The sealing strip 1' according to FIG. 4 is identical or similar in many features to the sealing strip 1 according to FIGS. 2 and 3. Components and functional sections of the sealing strip 1' according to FIG. 4, which are identical, structurally identical or functionally identical to components and functional sections of the sealing strip 1 according to FIGS. 2 and 3 are therefore given the same reference numbers; in this respect, reference is to be made to the description concerning the sealing strip 1 according to FIGS. 2 and 3.

The sealing strip 1' according to FIG. 4 differs from the sealing strip 1 according to FIGS. 2 and 3 inter alia in that the fastening structure 3 has at least one connecting section 4', which can be brought into operative position against the abutment 110 in order to form, with the sealing strip 1' fitted on, a form-fitting locking of sealing strip 1' and body part 100 or respectively body part 100 and 200, wherein the connecting section 4' is constructed in the manner of a snap element 20, such as for example a snap hook. The snap element 20 can therefore be brought into detent connection against the abutment 110, by the snap element 20 snapping in against the abutment 110 with the formation of a form-fitting locking.

The sealing strip 1' according to FIG. 4 differs from the sealing strip 1 according to FIGS. 2 and 3 inter alia also in that the connecting section 4' or respectively the snap element 20 of the sealing strip 1' is produced from a different plastic material from the mount 5 or respectively the carrier body 11 forming the mount 5. Preferably, the carrier body 11 forming the mount 5 is formed from a thermoplastic, such as for example polyprophylene. The connecting section 4' or respectively the snap element 20, which preferably is formed from a thermoplastic elastomer, for example from olefin-based cross-linked thermoplastic elastomers (TPV) or styrene block polymers, is formed on the carrier body 11, in particular injected on, so that the connecting section 4' has a higher elasticity compared with the carrier body 11 forming the mount 5, whereas the mount 5 formed from thermoplastic, or respectively carrier body 11, is accorded a relatively high component strength.

Through the embodiment of the connecting section 4' from a thermoplastic elastomer, different hardnesses can be predetermined in an individual manner according to the selection of the respective thermoplastic elastomer or respectively its composition. For example, a Shore hardness of between 60 to 90 ShA is able to be achieved for the connecting section 4'.

Figure 5:
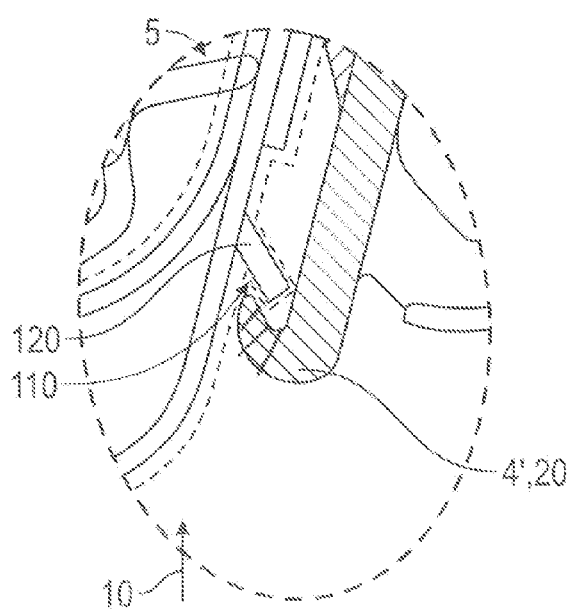
FIG. 5 is a cutout of the sealing strip according to FIG. 4 in the region of a form-fitting connection formed by the sealing strip and the vehicle door.

FIG. 5 shows the region of the mount 5, characterized in FIG. 4, with the connecting section 4' and the abutment 110 in an enlarged representation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A sealing arrangement for a window well of a motor vehicle, comprising:
   a vehicle door, comprising:
      an outer skin of the vehicle door having a substantially U-shaped upper end, and
      a reinforcing structure reinforcing the outer skin within the U-shaped upper end of the outer skin, the reinforcing structure comprising an abutment standing laterally inwards from the reinforcing structure relative to the outer skin of the vehicle door; and
   a window well sealing strip sealing an inlet of the window well, the window well sealing strip comprising:
      a sealing structure able to be brought into operative position against a window pane of the motor vehicle;
      a fastening structure configured to fasten the sealing strip onto the vehicle door, wherein the fastening structure comprises a mount configured to fit onto the substantially U-shaped upper end of the outer skin, the mount having a detent element having a tooth profile including a plurality of teeth configured to ratchetly engage the abutment of the reinforcing structure to lock the window well sealing strip to the vehicle door.

2. The sealing strip according to claim 1, wherein the detent element is one of connected with a wall of the mount, arranged on a wall of the mount, and formed on a wall of the mount.

3. The sealing strip according to claim 1, wherein the mount and the detent element consist of different materials.

4. The sealing strip according to claim 3 wherein the detent element is formed on the mount on a wall of the mount.

5. The sealing strip according to claim 3, wherein the detent element comprises a more elastic material than the mount.

6. The sealing strip according to claim 1, wherein the mount and the detent element consist of plastic.

7. The sealing strip according to claim 6, wherein the mount comprises a thermoplastic and the detent element comprises an elastomer or a thermoelastic elastomer.

8. The sealing strip according to claim 1, wherein the mount and the detent element consist of the same material.

9. The sealing strip according to claim 8, wherein the detent element and the mount consist of plastic.

10. The sealing strip according to claim 8, wherein the detent element and the mount comprise a thermoplastic.

11. The sealing strip according to claim 1 wherein the detent element is formed on the mount on a wall of the mount.

12. A motor vehicle comprising;
a vehicle door, comprising:
an outer skin of the vehicle door having a substantially U-shaped upper end, and
a reinforcing structure reinforcing the outer skin within the U-shaped upper end of the outer skin, the reinforcing structure comprising an abutment standing laterally inwards from the reinforcing structure relative to the outer skin of the vehicle door;
a window pane; and
a window well sealing strip sealing an inlet of the window well, the window well sealing strip comprising:
a sealing structure configured in an operative position against the window pane of the motor vehicle; and
a fastening structure configured to fasten the sealing strip onto the vehicle door, the fastening structure comprises a mount configured to fit onto the substantially U-shaped upper end of the outer skin of the vehicle door, the mount having a detent element having a tooth profile including a plurality of teeth configured to ratchetly engage the abutment of the reinforcing structure to lock the window well sealing strip to the vehicle door.

13. A sealing arrangement of a motor vehicle comprising:
a vehicle door, comprising:
an outer skin of the vehicle door having a substantially U-shaped upper end, and
a reinforcing structure reinforcing the outer skin within the U-shaped upper end of the outer skin, the reinforcing structure comprising an abutment standing laterally inwards from the reinforcing structure relative to the outer skin of the vehicle door; and
a window well sealing strip comprising:
a sealing structure in an operative position against a window pane of the motor vehicle, and
a fastening structure configured to fasten the window well sealing strip onto the vehicle door, wherein the fastening structure comprises a mount configured to fit onto the substantially U-shaped upper end of the outer skin of the motor vehicle, the mount having a detent element having a tooth profile including a plurality of teeth configured to ratchetly engage the abutment of the reinforcing structure to lock the window well sealing strip to the vehicle door.

* * * * *